Figure 1:
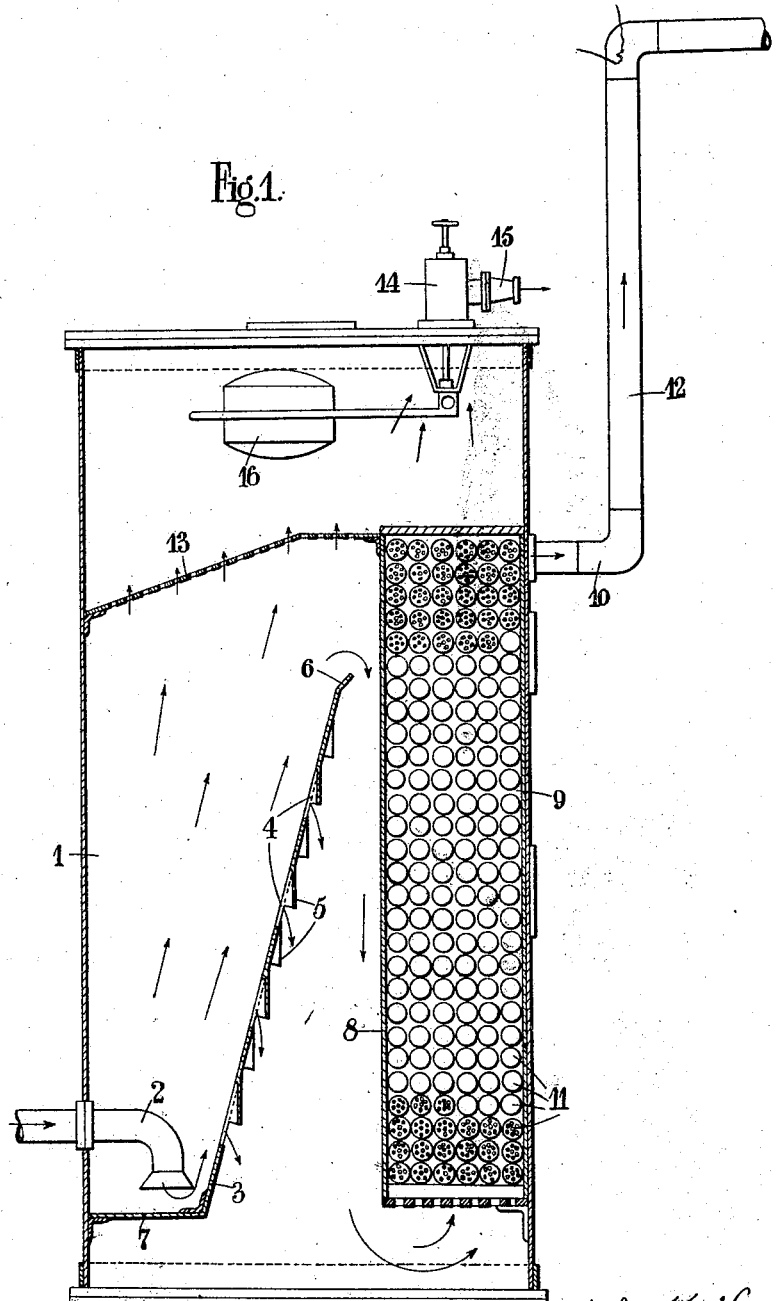

April 29, 1930.  H. J. HOLFORD  1,756,862
SEPARATOR FOR THE TREATMENT OF MIXTURES
OF MUTUALLY INSOLUBLE LIQUIDS
Filed Jan. 30, 1929   2 Sheets-Sheet 1

Patented Apr. 29, 1930

1,756,862

UNITED STATES PATENT OFFICE

HASTINGS JOHN HOLFORD, OF LONDON, ENGLAND, ASSIGNOR TO HARVEY HOLFORD SEPARATORS, LIMITED, OF LONDON, ENGLAND

SEPARATOR FOR THE TREATMENT OF MIXTURES OF MUTUALLY-INSOLUBLE LIQUIDS

Application filed January 30, 1929, Serial No. 336,279, and in Great Britain February 4, 1928.

This invention relates to separators for the treatment of mixtures of mutually insoluble liquids such, for instance, as oil and water of the kind including essentially a vessel, an inlet for the mixture to be treated adjacent to the base of the vessel, a partition extending from a point adjacent to the base of the vessel in an upward direction adapted to promote the separation of the liquids and means adapted to cause the heavier liquid separated to travel through or over baffle elements on its way to the outlet for the said liquid and a float-operated valve adapted to control the discharge of the lighter liquid.

In accordance with the invention the heavier material is caused to travel to the outlet therefor through a passage or chamber filled with packing material such, for instance, as a number of spheres or other conveniently formed bodies. Thus, for instance, the vessel may be provided with a section forming a passage the axis of which is parallel with the vertical axis of the vessel and extending from a point adjacent to the base thereof to a point somewhat above the outlet for the heavier liquid, in which are contained a plurality of spheres which may be hollow and each furnished with a plurality of holes, the spheres being conveniently formed of stoneware.

Alternatively the passage or chamber for the packing material may be external to the main separating chamber being connected thereto by suitable pipes.

From the outlet for the heavier liquid may extend a pipe, the length of which measured in a vertical direction from the top of the vessel should preferably be not less than 36 inches.

A further feature of the invention comprises the provision of means for preventing the operation of the float valve being interfered with by surging such as may occur when a device in accordance with the invention is arranged in a sea-going vessel.

To this end a perforated diaphragm may be arranged in such manner as to divide the vessel into an upper and a lower section. This diaphragm will normally be perforated with a large number of small holes and it may be arranged wholly or in part at an inclination with the horizontal extending from the wall of the vessel to the chamber or passage containing the baffle elements, the float-operated valve for discharging the liquid being arranged in the space above the diaphragm.

The invention extends to the employment in a separator of the construction above defined of a float-controlled valve according to filed application No. 250,308.

If desired, means may be provided in the separator for facilitating cleaning thereof by the injection of steam and as the cleaning of the portion of the device containing packing or similar material will be solely or mainly required in the operation of the device such cleaning means may be associated merely with that portion thereof in which the packing is arranged.

One construction, in accordance with the invention, is illustrated by way of example in the accompanying drawings, in which:—

Figure 2:
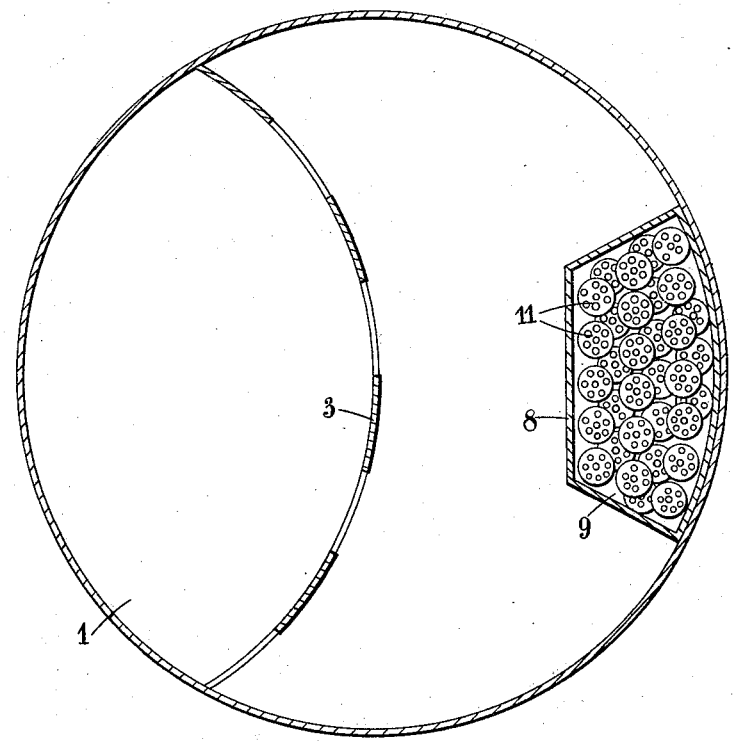

Figure 1 is a sectional elevation;

Figure 2 a cross-section of a separator, while

Figure 3:
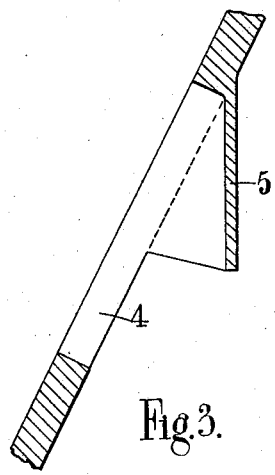

Figure 3 is a view of a detail.

In the drawings, 1 is the vessel forming the body of the separator, 2 the inlet for the mixture of mutually insoluble liquids to be treated, and 3 a partition extending from a point adjacent to the base of the vessel in an upward direction. This partition is inclined at an acute angle with the vertical and it is provided with apertures 4, each of which is normally larger in cross-sectional area than the inlet pipe and over each of which extends a baffle or deflector element 5. The upper edge 6 of this partition is shrouded or inclined at a greater angle with the vertical than the main portion of the partition.

The partition operates to assist in effecting a coarse separation of the lighter from the heavier liquid and as shown in the drawings its lower edge may terminate in a horizontal portion 7 located at a convenient distance above the base of the vessel, while the inlet pipe is provided with a downwardly curved portion adapted to direct the material introduced on to the horizontal portion of the partition.

Within the vessel is formed, by the partition 8, a passage or chamber 9, the axis of which is parallel with the vertical axis of the vessel and which extends to a point somewhat above the outlet 10, for the heavier liquid. In this chamber is provided packing in the form of hollow spheres 11, each furnished with a plurality of holes and formed of stoneware.

From the outlet 10 for the heavier liquid there extends in an upward direction a pipe 12, the length of which measured in a vertical direction from the top of the vessel is preferably not less than 36 inches.

Within the vessel is also provided a diaphragm 13 dividing the vessel into an upper and a lower section, this diaphragm being perforated with a large number of small holes and in the construction shown it is arranged mainly at an inclination with the horizontal and extending from the wall of the vessel to the chamber or passage 9. Above the perforated diaphragm is provided a valve 14 connected with the outlet 15 for the lighter liquid and controlled by the float 16, this float-controlled valve being preferably constructed as described in filed application 250,308.

In certain cases the association with the device of heating means as in known constructions for maintaining the material to be treated in a suitably mobile condition is desirable and to this end a steam heating coil may be located in the portion of the device in which the lighter liquid mainly collects. Thus, for instance, where the device is intended for the treatment of mixtures of water and a highly viscous oil lighter than water the heating means may be located adjacent to the float valve.

In the above description the provision of numerous features in liquid separators is described but it is to be understood that the scope of the invention is not limited to constructions of liquid separators comprising necessarily all of the features referred to or to specific combinations of these features.

Having now described my invention, what I claim as new and desire to secure by Letters Patent is:—

1. A separator for the treatment of mutually insoluble liquids, such for instance as oil and water, comprising a vessel, a perforated diaphragm dividing the same into an upper and lower section, an inlet for the mixture to be treated adjacent to the base of the vessel, a partition extending from a point adjacent to the base of the vessel in an upward direction adapted to promote the separation of the liquids, an outlet for the lighter liquid in the upper section of the vessel, a float-controlled valve associated with said outlet, an outlet for the heavier liquid below and adjacent to the diaphragm, a passage extending to said outlet from a point adjacent to the base of the vessel and packing material in said passage over which the liquid will flow on its way to said outlet.

2. A separator for the treatment of mutually insoluble liquids, such for instance as oil and water comprising a vessel, a perforated diaphragm dividing the same into an upper and lower section, an inlet for the mixture to be treated adjacent to the base of the vessel, a perforated partition extending from a point adjacent to the base of the vessel in an upward direction and inclined at an acute angle with the vertical, an outlet for the lighter liquid in the upper section of the vessel, a float-controlled valve associated with said outlet, an outlet for the heavier liquid in the lower section of the vessel and adjacent to the diaphragm, a passage extending to said outlet from a point adjacent to the base of the vessel, and packing material in said passage over which the heavier liquid will flow on its way to said outlet.

3. A separator for the treatment of mutually insoluble liquids, such for instance as oil and water, comprising a vessel, a perforated diaphragm dividing the same into an upper and lower section, an inlet for the mixture to be treated adjacent to the base of the vessel, a perforated partition extending from a point adjacent to the base of the vessel in an upward direction and inclined at an acute angle with the vertical, shrouded apertures in said partition, an outlet for the lighter liquid in the upper section of the vessel, a float-controlled valve associated with said outlet, an outlet for the heavier liquid in the lower section of the vessel and adjacent to the diaphragm, a passage extending to said outlet from a point adjacent to the base of the vessel, and packing material in said passage over which the heavier liquid will flow on its way to said outlet.

In testimony whereof I have signed my name to this specification.

HASTINGS JOHN HOLFORD.